(12) United States Patent
Collins et al.

(10) Patent No.: US 12,719,915 B2
(45) Date of Patent: Aug. 25, 2026

(54) ACTIVE AGENT FOR DETECTION OF BRIDGES TO AN AIR-GAPPED NETWORK

(71) Applicant: DOUBLE PATH SECURITY, LLC, Athens, GA (US)

(72) Inventors: David Collins, Philadelphia, PA (US); Frank Iacovino, Philadelphia, PA (US); Shea Nangle, Athens, GA (US); Alex Muentz, Philadelphia, PA (US); Matt Mahler, Westminster, CO (US)

( * ) Notice: Subject to any disclaimer, the term of this patent is extended or adjusted under 35 U.S.C. 154(b) by 65 days.

(21) Appl. No.: 19/022,243

(22) Filed: Jan. 15, 2025

(65) Prior Publication Data

US 2026/0205488 A1 Jul. 16, 2026

(51) Int. Cl.
*H04L 9/40* (2022.01)

(52) U.S. Cl.
CPC ...... *H04L 63/1433* (2013.01); *H04L 63/1441* (2013.01)

(58) Field of Classification Search
CPC ... H04L 63/1408–1425; H04L 63/1433; H04L 63/1441; H04L 63/1466; H04L 63/20; H04W 12/08–088
See application file for complete search history.

(56) References Cited

PUBLICATIONS

VandenBrink, R. "Data Exfiltration in Penetration Tests"—SANS Technology Institute Research Review Journal; vol. 5. Last Updated: Dec. 6, 2018. URL: https://isc.sans.edu/diary/24354 (Year: 2018).*

R/NISTControls. "Vulnerability scans for air gapped/standalone/ MUSA?"—Reddit.com. Last Updated: Jun. 23, 2022. URL: https:// www.reddit.com/r/NISTControls/comments/up8h3w/ vulnerability_ scans_for_air_gappedstandalonemusa/ (Year: 2022).*

* cited by examiner

*Primary Examiner* — Kevin Bechtel

(74) *Attorney, Agent, or Firm* — Sandollar Law; Alan Harrison

(57) ABSTRACT

The present disclosure relates to a method and system for detecting breaches in air-gapped networks through the use of agent-based software. The agent actively attempts to connect to external services outside the air-gapped network, and if any of these attempts are successful, an alert is triggered. This provides a proactive method for verifying the integrity of network isolation and detecting potential breaches in real-time.

14 Claims, 1 Drawing Sheet

ACTIVE AGENT FOR DETECTION OF BRIDGES TO AN AIR-GAPPED NETWORK

TECHNICAL FIELD

This disclosure relates to network security.

BACKGROUND

Air-gapped networks are designed to be completely isolated from the Internet or any other external networks, making them highly secure environments for sensitive data and vulnerable systems. For example, air-gapped networks may be utilized in military installations, hospitals, prisons, and commercial research facilities. Accordingly, maintaining and verifying the integrity of this isolation is critical.

Sophisticated attackers may exploit vulnerabilities or use covert means to bridge air gaps, which presents a significant risk to data security or connected systems. Existing methods for verifying network isolation primarily involve passive monitoring or physical inspections of networks, which may not be sufficient to detect modern threats that attempt to surreptitiously establish connections. Therefore, there is a need for a more proactive approach that can detect any unauthorized connection of an air-gapped network in real-time by actively testing its isolation.

SUMMARY

The present disclosure provides a system and method for detecting unauthorized bridges in air-gapped network isolation by deploying a software agent on one or more computers within the air-gapped network. The agent actively attempts to connect to external services outside of the isolated network. If any of these attempts are successful, meaning the agent is able to establish a connection to an external destination, the system triggers an alert, indicating that the air gap has been compromised or "bridged".

This disclosure introduces a highly proactive method of verifying network isolation, allowing real-time detection of unauthorized bridges through continuous testing of network boundaries.

DRAWINGS

Figure 1:
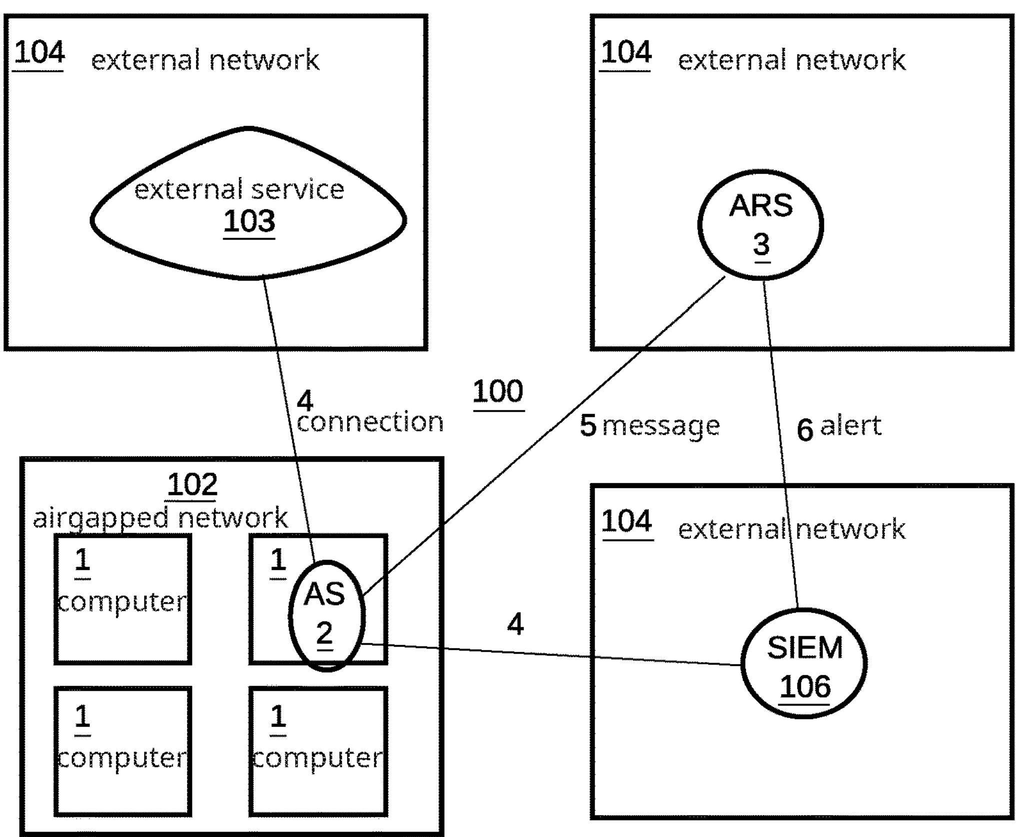

FIG. 1 shows a system 100 that incorporates an active agent 2 within an individual device 1 of an air-gapped network 102.

Figure 2:
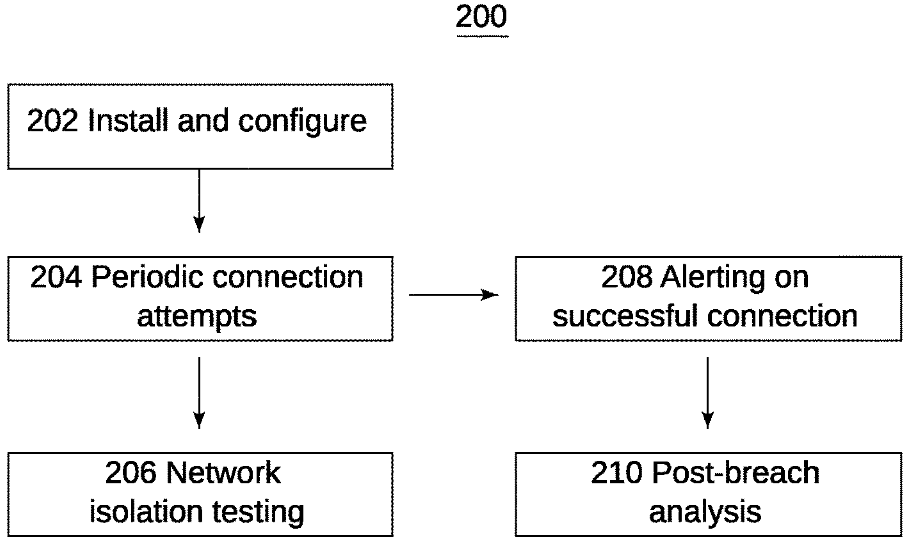

FIG. 2 shows a process 200 for set up and operation of the system 100.

DETAILED DESCRIPTION

The present disclosure relates to an active agent for detection of bridges to an air-gapped network. The disclosure uses an agent-based system that actively attempts to connect to external networks or services. This agent is deployed on one or more devices within the air-gapped network and continuously tests network integrity by sending connection requests to predetermined external services. If any connection attempts succeed, an alert is generated to notify the system administrator of a potential unauthorized connection.

System Architecture

The proposed system consists of several components:

Agent 2. A lightweight agent that runs on one or more computers 1 within the air-gapped network 102. The agent implements a Connection Verification Module (CVM) for periodically attempting to initiate connections 4 to one or more external services or IP addresses 103 that reside in external networks 104 outside the air-gapped network 102. The CVM is responsible for managing the outbound connection attempts. The CVM maintains a list of target services or destinations (e.g., external IP addresses or domain names) and regularly tries to establish connections to these targets. The module can utilize common network protocols such as HTTP, HTTPS, TCP, or DNS to simulate various types of outbound communication attempts.

The agent may be implemented as software installed on the computer(s) 1, e.g. a cron job or daemon process that periodically runs the CVM. Alternatively the agent may be implemented as a standalone device, e.g., a Raspberry Pi or similar small computer that periodically or continuously runs the CVM.

Alerting and Reporting System (ARS) 3. The ARS 3 is installed and operative on one or more external networks 104. When the CVM successfully connects to an external destination 103, even including the ARS 3, then the agent 2 sends a message 5 to the ARS 3. In response, the ARS triggers an alert 6. This alert contains detailed information about the connection attempt, including the time of connection, the external destination that was reached, and any relevant network data such as IP addresses and protocols used.

Customer security information and event management (SIEM) system 106. The ARS 3 sends the alert 6 to the SIEM 106. SIEM tools can be implemented as software, hardware, or managed services. SIEM systems log security events and generate reports to meet regulatory frameworks and to inform system operators (sysops) of security incidents so that corrective action may be taken. An SIEM can include, for example, a data collector that forwards selected audit logs from a host (agent based or host based log streaming into index and aggregation point); an ingest and indexing point aggregation point for parsing, correlation, and data normalization; and a search node that is used for visualization, queries, reports, and analysis of alerts.

Process Flow

The bridge detection process 200 operates as follows.

Agent Installation and Configuration 202. The agent 2 is installed on one or more computers 1 within the air-gapped network 102. During installation, the agent is configured with a list of external services or IP addresses 103 that it will direct its CVM to attempt to reach. These can include public IP addresses, specific cloud services, or any predetermined test addresses.

Periodic Connection Attempts 204. The agent 2 directs the CVM to periodically attempt to connect to the external destinations on the list. These attempts can be scheduled at regular intervals or randomized to reduce predictability. The connection attempts are designed to mimic legitimate outbound traffic, using various protocols such as HTTP, HTTPS, DNS, or even custom protocols.

Network Isolation Testing 206. The core purpose of these connection attempts is to verify whether the network is truly isolated. In an ideal air-gapped environment, all outbound connection attempts should fail, indicating that the network is properly isolated.

Alerting on Successful Connection 208. If the agent's CVM successfully establishes a connection to any external service, this indicates a failure or bridge or breach of the air gap. When this happens, the agent sends a message 5 to the ARS, which generates an alert 6 that is sent to the system administrator or security operations team, either by direct message or e-mail or optionally via the SIEM 106. The alert includes information such as:

The external destination reached (IP address, URL, etc.).

The time of the connection.

The protocol used (e.g., HTTP, HTTPS, TCP).

The computer or device that initiated the connection.

Post-Breach Analysis 210. Upon detection of a successful external connection, the system can collect additional data to determine the cause and method of the failure. It can also log detailed information to aid in forensic investigations.

Security and Reliability Features

Isolation of Agent Traffic. To ensure the integrity of the air-gapped network, the agent's outbound connection attempts are designed to be isolated and controlled. The agent 2 does not interfere with other network functions or generate excessive traffic that could trigger alerts, degrade network performance or affect other devices on the network.

Customizable Connection Targets. The external destinations that the agent 2 attempts to connect to are fully customizable. Administrators can define specific IP addresses, domain names, or cloud services to be targeted in the connection tests. This allows the system to adapt to different network configurations and security requirements.

Alert Customization. The ARS 3 can be configured to send alerts via various methods, including email, SMS, or integration with SIEMs. Alerts can be tailored based on the severity of the breach, allowing for immediate or escalated responses.

Embodiments and Use Cases

Use Case 1: High-Security Government Networks. The agent system can be deployed in government or military networks to provide real-time testing of air-gapped systems. Continuous verification of network isolation is crucial to protect sensitive data from external threats.

Use Case 2: Financial Institutions. Financial institutions that maintain air-gapped networks to secure transactional data can use the system to detect any breaches that might expose sensitive customer or financial information.

Use Case 3: Industrial Control Systems (ICS). Industrial control systems in sectors like energy, transportation, and manufacturing often rely on air-gapped networks for safety and security. The agent-based detection system can provide an additional layer of security by ensuring network isolation is not compromised.

The invention claimed is:

1. A method for detecting an unauthorized external connection in an air-gapped network, comprising:

installing an agent on one or more computers within the air-gapped network;

configuring the agent to periodically attempt to connect to an external service or IP address outside of the air-gapped network;

communicating a network specific name encoded within the communication to identify the source;

maintaining an alerting and reporting system on an external network that is configured for monitoring the success or failure of the agent's connection attempts;

triggering an alert by the alerting and reporting system when the agent successfully establishes a connection with any external service of the alerting and reporting system, indicating a breach of the air gap.

2. The method of claim 1, wherein the agent periodically attempts to connect to a list of predetermined external destinations, including public IP addresses or domain names.

3. The method of claim 1, wherein the agent uses various network protocols, including HTTP, HTTPS, DNS, or TCP, to attempt outbound connections.

4. The method of claim 1, wherein the alert is triggered by the agent sending a message to an alerting and reporting system outside the air-gapped network.

5. The method of claim 4, wherein the message includes information about the external destination, connection time, and the computer initiating the connection.

6. The method of claim 1, wherein the agent is implemented as a hardware device running a connection verification module.

7. A system for detecting breaches in air-gapped networks, comprising:

at least one computer processor within an air-gapped network executing an agent configured to periodically attempt to initiate an outbound network connection to an external destination outside of the air-gapped network; and an alerting and reporting system, comprising a memory and a computer processor, that is operative on an external network outside the air-gapped network and configured to trigger an alert when the agent successfully establishes the outbound network connection with the alerting and reporting system.

8. The system of claim 7, wherein the agent comprises a connection verification module that manages and tracks outbound connection attempts.

9. The system of claim 7, further comprising a security information and event management system receiving an alert from the alerting and reporting system.

10. The system of claim 7, wherein the alerting and reporting system sends the alert to at least one network security team member.

11. The system of claim 7, wherein the alerting and reporting system is installed in the outside system.

12. The system of claim 11, wherein the agent attempts to connect to the alerting and reporting system.

13. The system of claim 7, wherein the alerting and reporting system triggers the alert in response to the agent sending a message to the alerting and reporting system.

14. The system of claim 13, wherein the message includes information about the external destination, connection time, and the computer initiating the connection.

* * * * *